United States Patent [19]

Younge

[11] 4,355,279

[45] Oct. 19, 1982

[54] MEANS AND METHOD FOR VELOCITY DECODING

[75] Inventor: Robert G. Younge, Menlo Park, Calif.

[73] Assignee: Hewlett-Packard Company, Palo Alto, Calif.

[21] Appl. No.: 221,097

[22] Filed: Dec. 29, 1980

[51] Int. Cl.³ ............................................. G01P 3/56
[52] U.S. Cl. .................................... 324/161; 324/166
[58] Field of Search ............... 324/161, 166, 168, 175; 364/565; 318/601, 603

[56] References Cited

U.S. PATENT DOCUMENTS 3,968,434 7/1976 Dixon et al. ........................ 324/166
4,125,295 11/1978 Ruhnau et al. ................. 324/565 X Primary Examiner—Stanley T. Krawczewicz
Attorney, Agent, or Firm—Edward Y. Wong

[57] ABSTRACT

A velocity decoder system capable of providing information on a wide range of velocities is disclosed. Initially, an estimated velocity of the actual velocity is entered in the system. Then by constantly updating and correcting the estimated velocity in view of the actual velocity, accurate velocity information on a system is obtained almost instantaneously. To broaden the range of velocities decoded without unduly complicating the decoder system or greatly decreasing the sampling rate, circuitry for autoranging that enable utilization of common circuits for different ranges is implemented.

4 Claims, 5 Drawing Figures

MEANS AND METHOD FOR VELOCITY DECODING

BACKGROUND OF THE INVENTION

Virtually all servomechanical systems require rate or velocity feedback to achieve stability. The accuracy of the velocity information, however derived, is often crucial to the successful stabilization of the system. Consequently, there is a great variety of methods which are generally used to obtain this velocity information.

In the prior art, electronic tachometers, or transducers from which velocity information can be derived in the form of a voltage proportional to the instantaneous velocity, are used for this purpose. Among the most popular transducers of this type are optical encoders and accelerometers. Optical encoders are really incremental position transducers; accelerometers, in contrast, measure acceleration.

An optical encoder typically comprises a disc with lines of alternate opaque and transparent sections, together with a stationary reticle, illuminator, and a light-sensitive assembly. The disc is connected to a shaft of a motor whose velocity is to be controlled. When the disc moves past the reticle, a shuttering effect is created. This shuttering effect is sensed by the light-sensitive assembly and translated into an electrical signal. This electrical signal is generally a quasi-sinusoidal train of encoder pulses having a period equal to the line spacing on the disc and a frequency directly proportional to the shaft speed. By counting the cycles, a relative position of the disc is known. And by using two separate channels in quadrature on the encoder, the direction of rotation is determined. The velocity information is obtained from position by differentiating and from acceleration by integrating. Both the differentiating and integrating processes, however, are fraught with problems. Differentiating reduces the signal-to-noise ratio, and integration acts to magnify even the smallest of steady-state errors, given enough time in the integration.

A classical decoding method is the "bang-bang" system of operation. In a typical digital velocity optical encoder system, the shaft encoder information is not converted into a continuous velocity. In such a system, the system operates by simply determining whether the encoder frequency is between precisely determined limits. When the speed is too low, the motor is accelerated; when the speed is too high, the system friction losses are allowed to decelerate the motor. Hence, the system is regulated by being fully on or fully off in a "bang-bang" manner. Although such a "bang-bang" system is quite stable, it lacks continuous and instantaneous correction signals for a true feedback system. Thus, this system is adequate in a velocity loop with a very limited velocity range only and is inadequate for a position feedback loop.

To circumvent some of these problems, the velocity information can be decoded from the optical encoder by measuring the period between successive encoder pulses. Velocity, then, is derived by taking an inverse of this period.

Although this decoding method bypasses some of the problems of other methods in the prior art, it nevertheless presents some problems of its own. First, the operating speed range is limited. Since the period is usually measured digitally with a counter and a clock, the clock must be fast enough to resolve short time periods. Concurrently, it must not be so excessively fast that long time periods are longer than what the counter can measure. Hence, the operating speed range is usually limited in such a method.

The decoder in accordance with the preferred embodiment of the present invention overcomes the disadvantages associated with those of the prior art. It also allows for a wide dynamic range and the error feedback signals are continuous and substantially instantaneous, thus providing an adequate sampling rate over the wide dynamic velocity range. Additionally, the decoder in accordance with the preferred embodiment of the invention can be easily incorporated into a single integrated circuit.

SUMMARY OF THE INVENTION

By estimating the present velocity and comparing it with the actual velocity as measured, and then readjusting the estimated velocity with each measurement cycle to closer approximate the actual velocity, highly accurate and continuous velocity information is obtained from a shaft encoder. This is accomplished as follows.

A first counter, the estimate counter, is initially preset to the maximum expected velocity value at the start of an encoder cycle. It is reduced by decrements of one at intervals of time determined by a second counter, the timer counter. When the timer counter counts to zero, that is, clocks down to zero, before the end of a quadrature state or encoder cycle, the estimate counter preset entry is reduced and the timer counter loaded with a new preset figure read from successive words in a read-only-memory device (ROM). If these nonuniform time intervals are correctly chosen from the ROM, the count state of the estimate counter will at all times approximate the reciprocal of the time delay from the start of the encoder cycle. When the preset cycle ends and the next encoder cycle occurs, this estimate count is the actual velocity, which becomes the output of the velocity decoder, and the entire cycle restarts.

To save ROM space while handling a large dynamic range of velocities, the velocity decoder performs a sort of autoranging. This is accomplished by timing either 1, 2, 4, 8, or 16 encoder cycles, rather than solely one encoder cycle as described above, so that the actual time interval over which the circuit operates stays within a relatively narrow range.

The sign of the velocity needs also to be determined. It is determined by the direction of the shaft encoder transitions that initiate the decoding cycle. If the encoder transitions of the opposite sign occurs while the cycle is in progress, the decoder immediately enters an output of zero and restarts the decoding cycle.

DETAILED DESCRIPTION OF THE INVENTION

Figure 1:
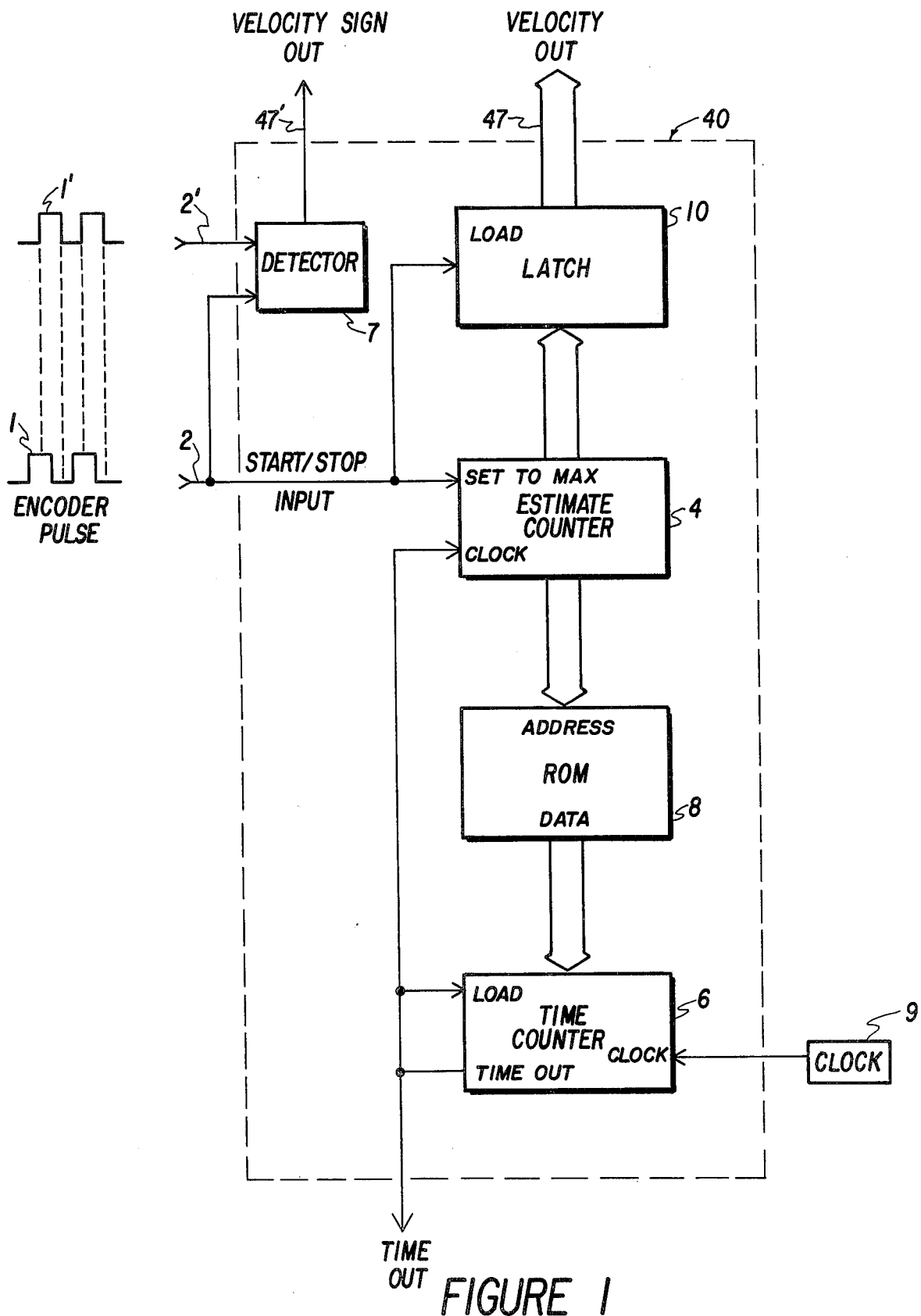
FIG. 1 shows the decoder in accordance with the preferred embodiment of the invention.
Figure 5:
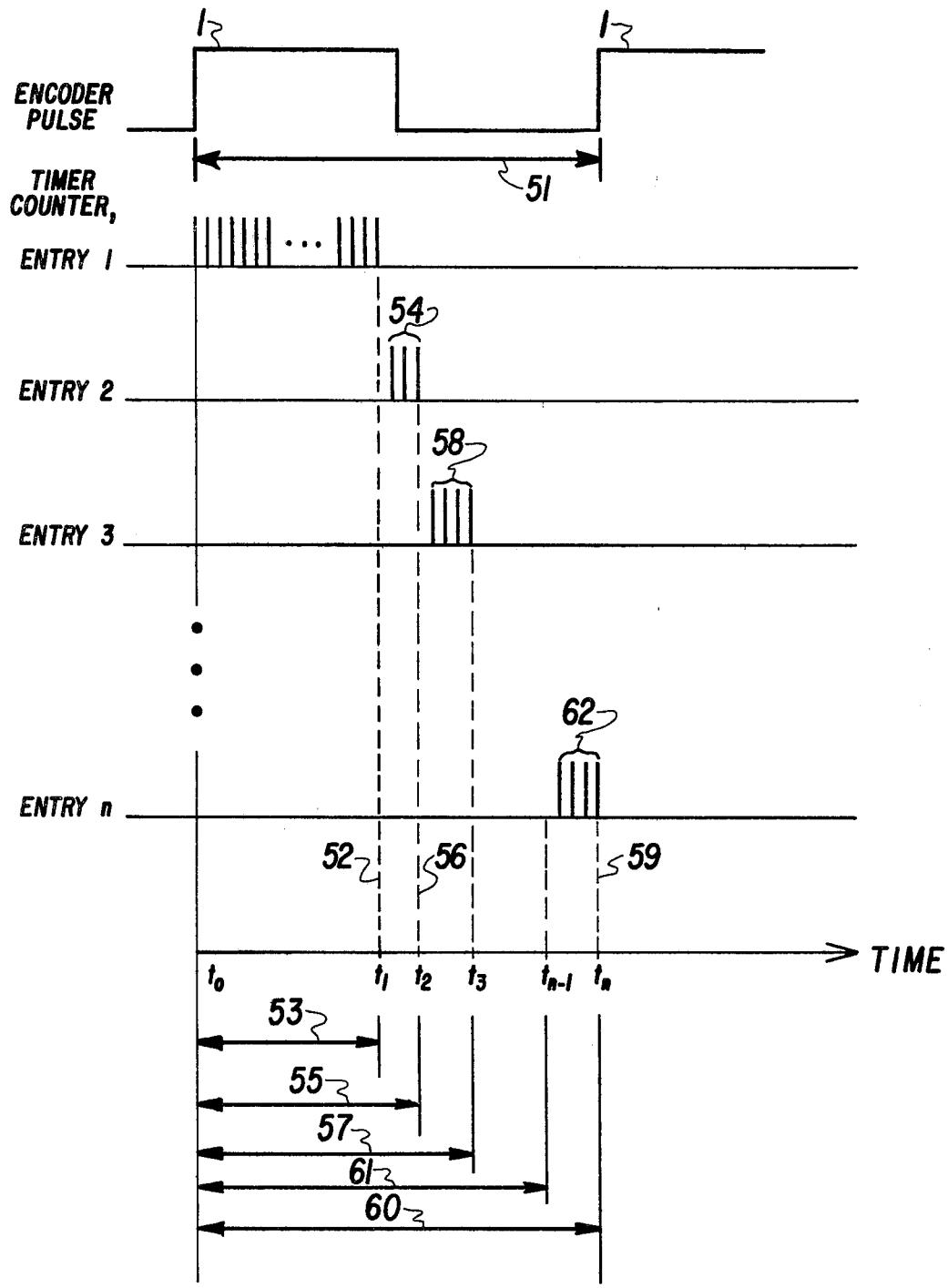
FIG. 5 shows a timing diagram illustrating the sequence of events in the main decoder embodied in accordance with the invention.

In the system in accordance with the preferred embodiment of the invention as shown in FIG. 1 and as represented in the timing diagram of FIG. 5, a train of encoder pulses 1 having a period that is inversely proportional to an unknown velocity is applied to an input line 2. This pulse train 1, for example, can be the output of a shaft encoder (not shown).

At the beginning of a decoder cycle, a maximum estimated velocity is first loaded into a first counter, the estimate counter 4. The maximum estimated velocity is predetermined by the maximum speed the shaft encoder is likely to encounter. The equivalent period 53 of the pulse train 1 for this first estimated velocity is applied to a second counter, the timer counter 6. This equivalent period is retrieved from a stored memory 8, for example, a read-only memory (ROM), to give the period corresponding to the estimated velocity.

If the equivalent period 53 is correct as entered into the timer counter 6, the timer counter 6 will count down to zero precisely at the end of an encoder pulse period 51. If the equivalent period is not correct, the counter will reach zero at some point 52 before the end of the actual period 51. In such an event, the estimate counter 4 is decreased by one, as a new estimated velocity, and the timer counter 6 is reloaded with the difference 54 in period between the prior estimated velocity and the new estimated velocity 55. This period differential 54, the new entry in the timer counter 6, is counted down to a new zero 56. If the counter reachs zero again before the end of the actual period 51, the estimate counter 4 again is decreased by one, and another equivalent period 57 is used. The difference 58 between this new equivalent period with the immediately prior one is entered into the timer counter 6 as a new period differential 58 for countdown.

The timer counter 6 proceeds to count down with the new period differential 58 until zero. If the end of the actual period 51 has not arrived yet, the whole process is repeated, ad infinitum, until the timer counter 6 reaches zero simultaneously with the end of the actual period 51. This event occurs at a time $t_n$ in FIG. 5. In other words, the estimate counter 4 again is decreased by one, a new equivalent period is used, and a new period differential is entered into the timer counter 6 for countdown. If the current entry 62 in the timer counter 6 counts down to zero coincidentally with the occurrence 59 of the end of the actual period 51, the current estimated velocity in the estimate counter 4 then is the actual velocity. This value on line 5 is then coupled to the output for processing. As part of the output, there can be a latching circuit 10 to maintain an output of this value while a new velocity is being determined or decoded.

A numerical example of the above process follows. References are to FIGS. 1, 2 and 5.

Figure 2:
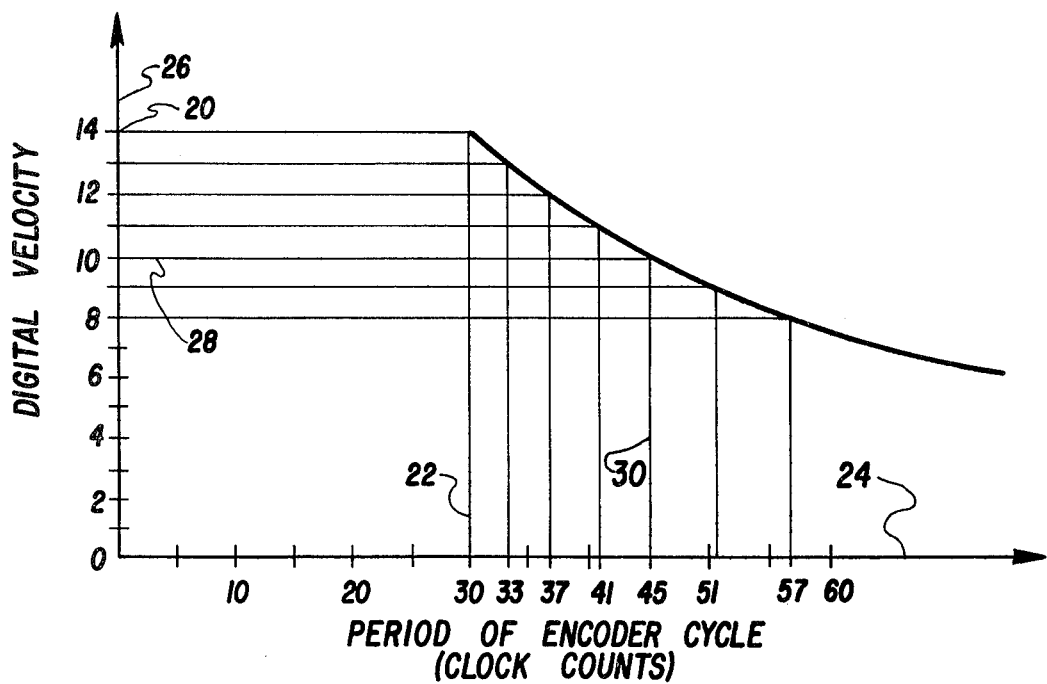
FIG. 2 shows a velocity profile, that is, the relationship between decoding period and digital velocity.

At the beginning of an encoder cycle, or decoding period, $t_0$, the maximum estimated velocity 20, for example, fourteen, is entered into the estimate counter 4. The equivalent period corresponding to this velocity, as an example, is thirty clock transitions 22, 53. This equivalent period is entered into the timer counter 6. The values for equivalent periods in this example are based on the relationship between period 24 and digital velocity 26 as shown in FIG. 2. This relationship is defined by $V = \Delta X/\Delta t$, where V is the digital velocity, $\Delta X$ is the spacing of the slits on the shaft encoder, and $\Delta t$ is the period between slits. If the actual velocity 28 instead is, for instance, ten, the actual period 30 according to FIG. 2 would comprise forty-five clock transitions 60. Thus, the thirty in the timer counter 6 will count down to zero 52 long before the actual period 51 ends. At zero count of the timer counter 6, the estimate counter 4 decreases its entry from fourteen to thirteen, a decrement of one. The period differential 54 in this example is three (viz., the difference between thirty and thirty-three). This period differential 54 is then loaded into the timer counter 6, and the timer counter 6 counts down from three. When a new zero is reached 56, the end of the period 59 has still not been reached. The total period clock transitions 55 number only thirty-three, still short of the actual forty-five transitions 60 that are associated with a velocity of ten. Since the timer counter 6 has reached zero before the end of the actual period as evidenced by the train of pulses 55, the estimate counter 4 again is decreased by one to arrive at a new estimated velocity of twelve. The equivalent period for this new estimated velocity 57 is thirty-seven, or a period differential 58 of four from the immediately prior equivalent period 55 of thirty-three. The new period differential 58 of four is entered into the timer counter 6, and the timer counter 6 counts down. This process of decreasing and arriving at a new period differential is repeated until a differential 62 of four is added to a last equivalent period 61 of forty-one to arrive at a new equivalent period 60 of forty-five. This, of course, corresponds to a velocity of ten according to the curve in FIG. 2. With this equivalent period 60 identical to the actual period 51, the timer entry of four in the timer counter 6 is counted down to zero simultaneously with the occurrence of the end of the decoding period 59. This then signifies that the last estimated velocity corresponding to the last equivalent period 60 is the correct one for coupling to the output.

In the preferred embodiment of the invention, the output comprises a latching circuit 10 with which the last correct estimate velocity is held until the next correct estimate velocity is obtained. This numerical example shows an in-process decoding of the velocity. This process is in contrast to the more usual decoding schemes of obtaining the velocity after the fact. Information on almost instantaneous velocities can be obtained by this method of velocity decoding.

Figure 3:
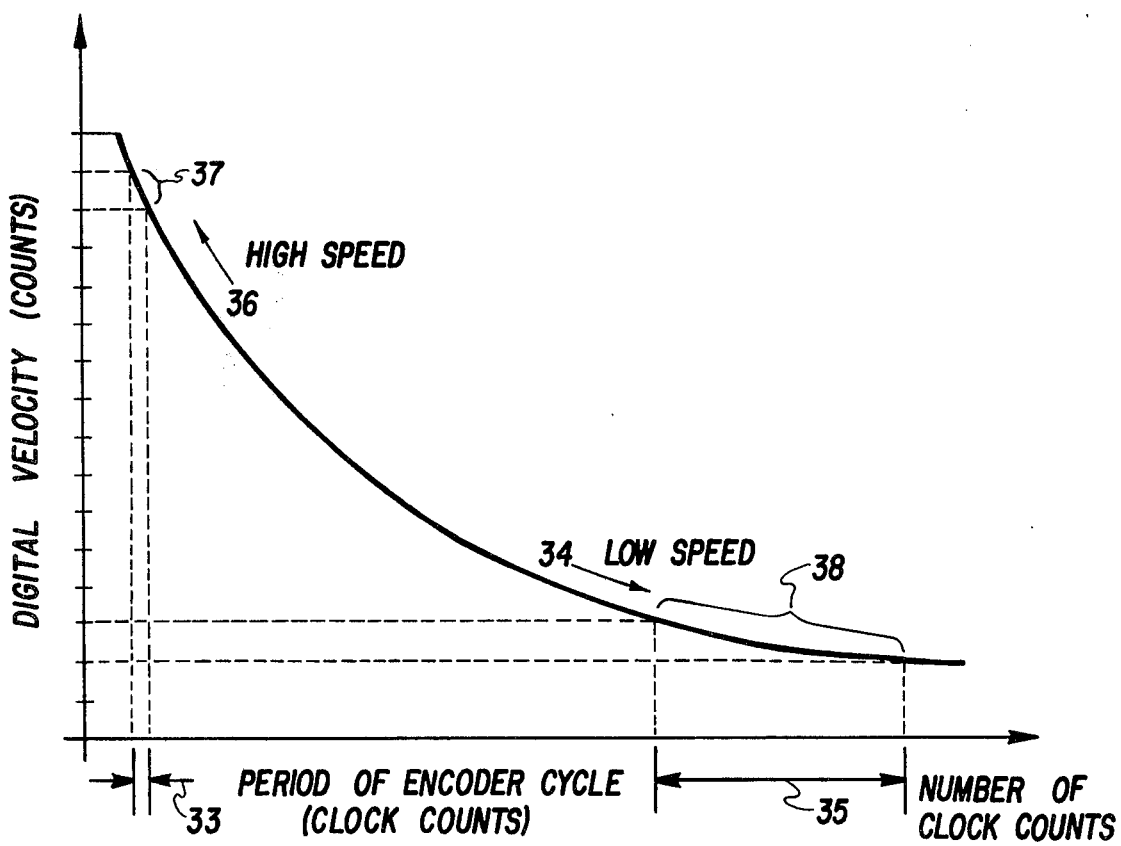
FIG. 3 exemplifies the difference in incremental timing periods between high and low velocities.

As can readily be seen in FIG. 3, the incremental timing periods 33 and 35 differ markedly between that for low speed 34 and that for high speed 36. The incremental timing period 33 is very short at higher velocity points 37 on the one hand, and it 35 is very long at lower velocity points 38 on the other hand. This marked difference in incremental timing periods creates a problem in clocking. The clock 9 which is used to count down the incremental timer counter 6 must be fast enough to resolve the short differential time periods. Yet, it must not be too fast so that the long time periods are longer than what the incremental timer counter 6 can measure. Thus, a large dynamic range of velocities requires both a fast clock and a large incremental timer counter. The fast clock is to accommodate high velocity measurement and the large timer counter is to accommodate low velocity measurement. In the preferred embodiment of the invention, decoding may be accomplished in time intervals longer than the period for one encoder pulse as described in the heretofore system. To be precise, the decoding interval can also be the period for the 2, 4, 8, or 16 encoder pulses. In this way, the dynamic range of velocities is greatly expanded and the same clock and timer counter can be used for both low and high velocities. As a consequence, the ROM size can be limited economically and yet be adequate to serve the whole dynamic range. Also with this scheme, the sampling rate, which is the update rate fed to latch 10, remains essentially constant by a small factor and is adequate for velocity information used in position feedback loops.

Figure 4:
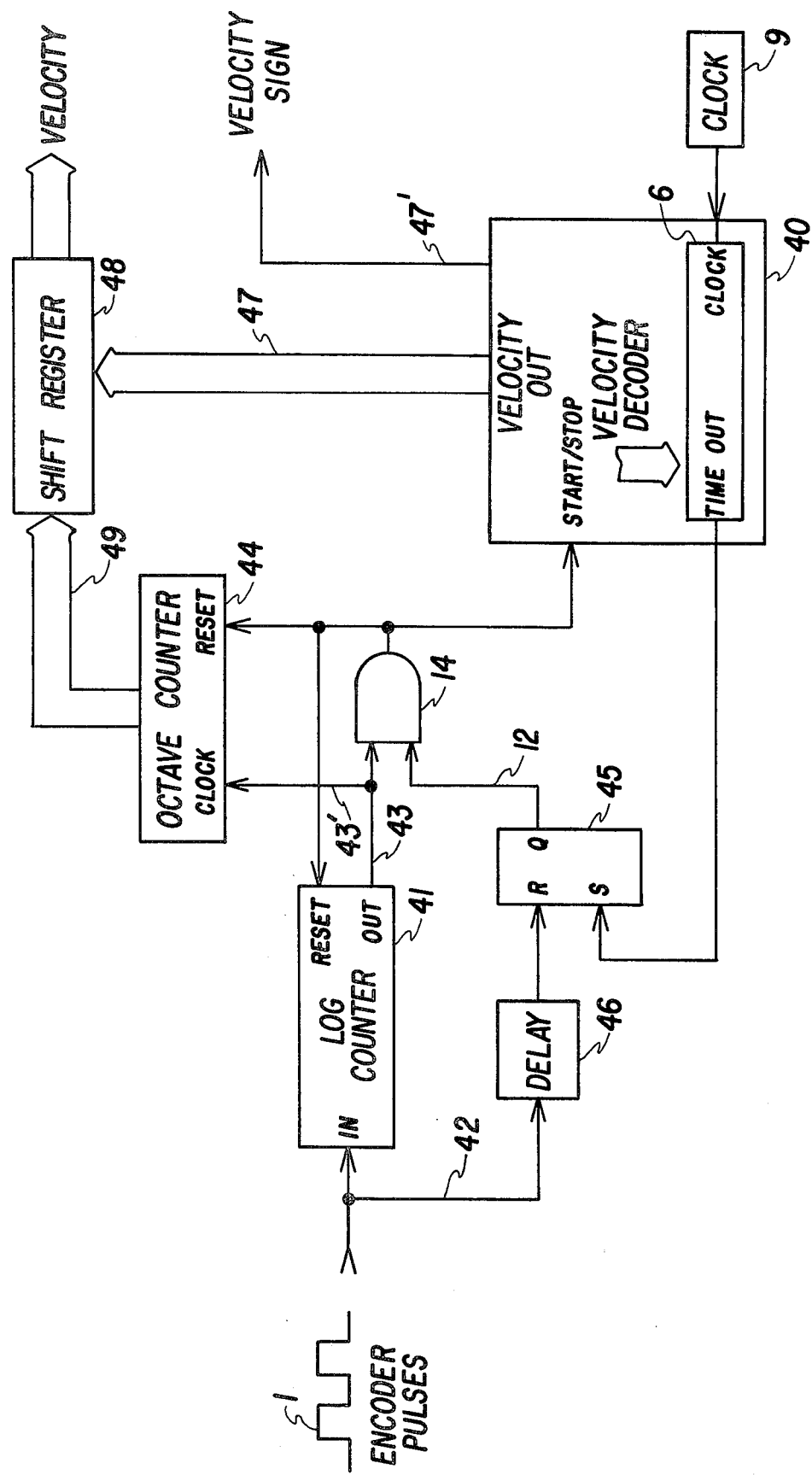
FIG. 4 shows the decoder of FIG. 1 in a decoding system with autoranging circuitry.

FIG. 4 shows the basic velocity decoder 40 of FIG. 1 with autoranging circuitry added so that the same clock 9 and timer counter 6 can be used in a wide range of velocities. A log counter 41 coupled to the input line 42 to receiver encoder pulses 1 generates an output pulse on line 43 after 1, 2, 4, 8, and 16 input pulses. The decoder 40 then determines the time interval required for 1, 2, 4, 8, or 16 encoder pulses. It does so in the following manner. The output of the log counter 41 on line 43 is coupled to an octave counter 44 via a line 43' connecting the two counters 41 and 44. Octave counter 44 is a standard up-counter. The input pulse 2 on line 42 is also coupled to an RS flip-flop 45, after a delay through a delay circuit 46. RS flip-flop 45 is in the low state during the initial estimate velocity part of the decoding cycle, that is, the initial timing; it is in the high state otherwise.

At the start of a decoding cycle, the output of flip-flop 45 on its output line 12 is initially high, and the log counter 41 and octave counter 44 are reset. An input encoder pulse on line 42 produces a pulse on the output line 43 of the log counter 41; this starts the decoding cycle in the main decoder 40. This pulse on line 42 also resets the RS flip-flop 45 after a delay. In this way, the log counter output on line 43 is prevented from stopping the main decoder 40 until after the initial timing. Thus, if the actual velocity is greater than anticipated and consequently is also greater than the estimated maximum velocity of a velocity profile, more than one encoder pulse will occur before the initial timer counter 6 has reached zero, e.g. at $t_n$. In other words, before the initial timing is completed at $t_n$, several encoder pulses will have occurred. These multiple encoder pulses are being tallied by the octave counter in the meantime. Only after the initial timing when the RS flip-flop 45 has been set to high again is the output of the RS flip-flop 45 allowed to pass through an AND gate 14 to stop the main decoder 40. The next log counter output pulse after this initial timing then reaches the main decoder 40, terminates both the main decoder 40 and the autoranging circuitry, resets both itself and the octave counter 44, and starts the entire decoding cycle over again. In other words, timing and decoding occur from one input encoder pulse until the occurrence of the first log counter pulse after the initial timing of the estimated maximum velocity. This process differs from the case when there is no autoranging, where timing and decoding occur from one encoder pulse to the next.

Concurrently with the operation of the log counter 41 and RS flip-flop 45, the octave counter 44 has been tallying the number of log counter output pulses on line 43 that have occurred during the decoding interval. The velocity output of main decoder 40 on line 47 must be multiplied by two raised to this tallied number to yield the actual velocity in a shift register 48. In an alternate embodiment, the velocity output of main decoder 40 on line 47 is divided or multiplied to yield the actual velocity on a shift register depending on the velocity range. This optimizes the accuracy of the velocity information. As shown in FIG. 4, shift register 48 is controlled by the count, or tallied number, in the octave counter 44 via an output line 49 to the shift register 48. The shift register 48 accomplishes the aforementioned numerical operation. In this way, the fact that the velocity information is from a multiple of encoder pulse periods is accounted for and and autoranging is accomplished.

The output 47 and 47' of the decoder 40 is the velocity comprising a magnitude and sign, respectively. The magnitude is derived as above. The sign is determined by the direction of the shaft encoder transition that started the decoding cycle. This is accomplished by detecting two channels 2 and 2' containing the train of encoder pulses in quadrature 1 and 1' at a detector circuit 7. If, while the decoder is in operation and an encoding transition occurs with a sign opposite to that of the initial transition, the decoder 40 returns a velocity of zero and starts over.

I claim:

1. A velocity decoding technique comprising the steps of:
   a. applying periodic transitions having a period inversely proportional to a velocity;
   b. estimating said velocity as an estimated velocity;
   c. converting said estimated velocity to an equivalent period;
   d. measuring the actual period between said transitions;
   e. comparing said measured period with said equivalent period;
   f. manipulating said estimated velocity to a next estimated velocity in response to an unequal comparison in step e;
   g. repeating steps c through f until said next estimated velocity equals said actual velocity by having said measured period equal to said converted period; and
   h. coupling said estimated velocity to an output when said estimated velocity equals said actual velocity.

2. A velocity decoding system for decoding an electrical signal having a train of transitions proportional to an actual velocity comprising:
   an input port for accepting a first input electrical signal;
   a first counter means coupled to said input port for making an estimated velocity of said actual velocity;
   a memory means coupled to said first encounter means for converting said estimated velocity into an equivalent period;
   a second counter means coupled to said memory means for counting down said equivalent period and for directing a new estimated velocity in said first counter means; and
   an output port coupled to said first counter means for coupling the value of said estimated velocity.

3. The system as in claim 2 further comprising an autoranging means for generating an output pulse in response to selected input transitions in a second input electrical signal applied thereto, said output pulse being coupled to said input port as said first input electrical signal.

4. The system as in claim 3 wherein said autoranging means comprises:
   an autoranging input port for accepting said second input electrical signal applied thereto;

a third counter means coupled to said autoranging input port for generating a third counter output pulse in response to selected input transitions in said second input electrical signal, said third counter output pulse functioning as said first input electrical signal;

a delay means coupled to said autoranging input port for delaying said second input electrical signal by a selected period;

a bistable circuit coupled to said delay means for receiving said delayed second input electrical signal and to said second counter means for providing a responsive bistable output pulse;

a gating means coupled to said bistable circuit and to said third counter means for providing a gating output pulse to said first counter means in response to said responsive bistable output pulse;

a fourth counter means coupled to said third counter means for tallying said third counter output pulses and to said gating output pulse for resetting; and a register means coupled to said fourth counter means and to said output port for providing an output representative of an actual velocity.

* * * * *